United States Patent
Sugae

(10) Patent No.: US 11,327,173 B2
(45) Date of Patent: May 10, 2022

(54) OBJECT DETECTION DEVICE

(71) Applicant: AISIN CORPORATION, Kariya (JP)

(72) Inventor: Ippei Sugae, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/905,189

(22) Filed: Jun. 18, 2020

(65) Prior Publication Data

US 2020/0400816 A1      Dec. 24, 2020

(30) Foreign Application Priority Data

Jun. 21, 2019 (JP) .............................. JP2019-115727

(51) Int. Cl.
    *G01S 15/04* (2006.01)
    *G01S 7/527* (2006.01)
    *G01S 15/931* (2020.01)

(52) U.S. Cl.
    CPC ............ *G01S 15/04* (2013.01); *G01S 7/5273* (2013.01); *G01S 15/931* (2013.01); *G01S 2015/938* (2013.01)

(58) Field of Classification Search
    CPC ...... G01S 15/04; G01S 7/5273; G01S 15/931; G01S 2015/938
    See application file for complete search history.

(56) References Cited

U.S. PATENT DOCUMENTS

| | | | |
|---|---|---|---|
| 5,798,728 A | | 8/1998 | Tomishima et al. |
| 2004/0148063 A1* | | 7/2004 | Patchell ................. B60T 17/22 701/1 |
| 2016/0018511 A1* | | 1/2016 | Nayyar ................. G01S 13/878 342/27 |
| 2016/0124084 A1* | | 5/2016 | Lim ....................... G01S 7/412 342/160 |
| 2020/0033462 A1* | | 1/2020 | Ding ..................... G01S 15/104 |

FOREIGN PATENT DOCUMENTS

| | | |
|---|---|---|
| DE | 102010033384 A1 | 2/2012 |
| EP | 3382419 A1 | 10/2018 |
| JP | 2006-292597 A | 10/2006 |

OTHER PUBLICATIONS

Communication dated Nov. 17, 2020, from the European Patent Office in application No. 20181020.7.

* cited by examiner

*Primary Examiner* — Hongmin Fan
(74) *Attorney, Agent, or Firm* — Sughrue Mion, PLLC

(57) ABSTRACT

An object detection device includes: a transmission unit transmitting a first transmission wave; a reception unit receiving a first reception wave reflected by an object; a signal processing unit sampling a first processing target signal according to the first reception wave and acquiring a difference signal based on a difference between the first processing target signal for at least one sample at a certain detection timing, and the first processing target signal for a plurality of samples in at least one of first and second periods; a threshold setting unit setting a threshold as a comparison target with the value of the difference signal, based on variation in the values of the first processing target signal for the plurality of samples; and a detection unit detecting information about the object at the detection timing based on a comparison result between the value of the difference signal and the threshold.

8 Claims, 9 Drawing Sheets

OBJECT DETECTION DEVICE

CROSS REFERENCE TO RELATED APPLICATIONS

This application is based on and claims priority under 35 U.S.C. § 119 to Japanese Patent Application 2019-115727, filed on Jun. 21, 2019, the entire content of which is incorporated herein by reference.

TECHNICAL FIELD

This disclosure relates to an object detection device.

BACKGROUND DISCUSSION

Conventionally, in a technique of detecting information about an object based on transmission and reception of radar, constant false alarm rate (CFAR) processing is known as processing for reducing noise called clutter that occurs due to reflection by an object that is not a detection target. In outline, CFAR processing is processing for acquiring a difference signal based on a difference between a value (signal level) of a processing target signal according to a reception wave and an average value of values of the processing target signal. In the existing technique using such CFAR processing, the reception wave as a transmission wave reflected by and returned from an object that is a detection target is detected based on a comparison between the value of the difference signal and a fixed threshold.

Here, in the existing technique as described above, it is desirable that the fixed threshold which is a comparison target of the value of the difference signal obtained as a result of CFAR processing is set to such a magnitude that the reception wave as the transmission wave reflected by and returned from the object that is a detection target is detected but clutter is not detected.

However, in general, a degree of clutter is not constant, and may vary, for example, depending on an environment such as a state of a ground (road surface) on which the object that is a detection target is provided. Accordingly, in the existing technique as described above in which the fixed threshold is used as the comparison target of the value of the difference signal, depending on the environment, not only the reception wave as the transmission wave reflected by and returned from the object that is a detection target but also clutter may be detected.

A need thus exists for an object detection device capable which is not susceptible to the drawback mentioned above.

SUMMARY

An object detection device as an example of this disclosure includes a transmission unit that transmits a first transmission wave, a reception unit that receives a first reception wave as the first transmission wave that is reflected by and returned from an object, a signal processing unit that samples a first processing target signal according to the first reception wave and acquires a difference signal based on a difference between a value of the first processing target signal for at least one sample according to the first reception wave received at a certain detection timing, and an average value of values of the first processing target signal for a plurality of samples according to the first reception wave received in at least one of a first period and a second period of a predetermined time length that exist before and after the detection timing, a threshold setting unit that sets a threshold which is a comparison target with the value of the difference signal, based on variation in the values of the first processing target signal for the plurality of samples, and a detection unit that detects information about the object at the detection timing based on a comparison result between the value of the difference signal and the threshold.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment and a modification example of this disclosure will be described with reference to the drawings. The configurations of the embodiment and modification example described below, and actions and effects provided by the configurations are merely examples, and the embodiment disclosed here is not limited to the contents described below.

EMBODIMENT

Figure 1:
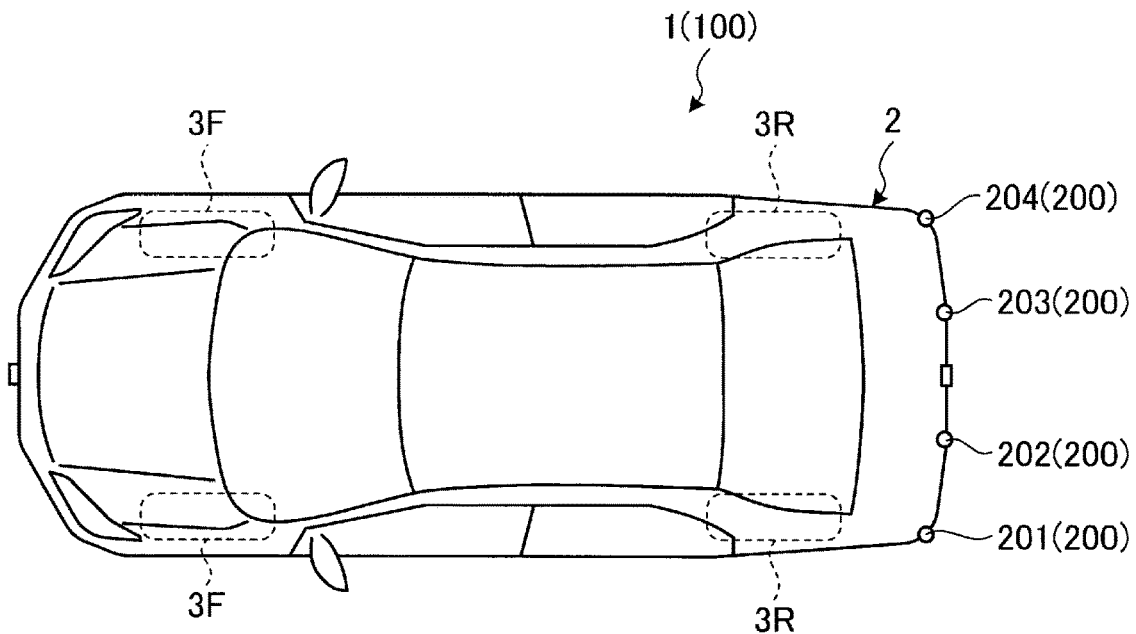
FIG. 1 is an exemplary and schematic diagram illustrating an appearance of a vehicle including an object detection system according to an embodiment when viewed from above.

FIG. 1 is an exemplary and schematic view illustrating an appearance of a vehicle 1 including an object detection system according to an embodiment when viewed from above. As described below, the object detection system according to the embodiment is an on-board sensor system that performs transmission and reception of sound waves (ultrasonic waves) and acquire a time difference between the transmission and reception to detect information about an object (for example, obstacle O illustrated in FIG. 2 described later) including human beings present in the surroundings.

As illustrated in FIG. 1, the object detection system includes an electronic control unit (ECU) 100 mounted inside the four-wheel vehicle 1 including a pair of front wheels 3F and a pair of rear wheels 3R, and object detection devices 201 to 204 mounted on the exterior of the vehicle 1.

In the example illustrated in FIG. 1, as an example, the object detection devices 201 to 204 are installed at different positions, for example, on the rear bumper at the rear end of a vehicle body 2 as the exterior of the vehicle 1.

In the embodiment, hardware configurations and functions of the object detection devices 201 to 204 are the same. Accordingly, in the following, for simplicity, the object detection devices 201 to 204 may be collectively referred to as an object detection device 200.

In the embodiment, an installation position of the object detection device 200 is not limited to the example illustrated in FIG. 1. The object detection device 200 may be installed, for example, on the front bumper at the front end of the vehicle body 2, may be installed on the side surface of the vehicle body 2, or may be installed on two or more of the rear bumper, the front bumper, and the side surface. In the embodiment, the number of object detection devices 200 is not limited to the example illustrated in FIG. 1.

Figure 2:
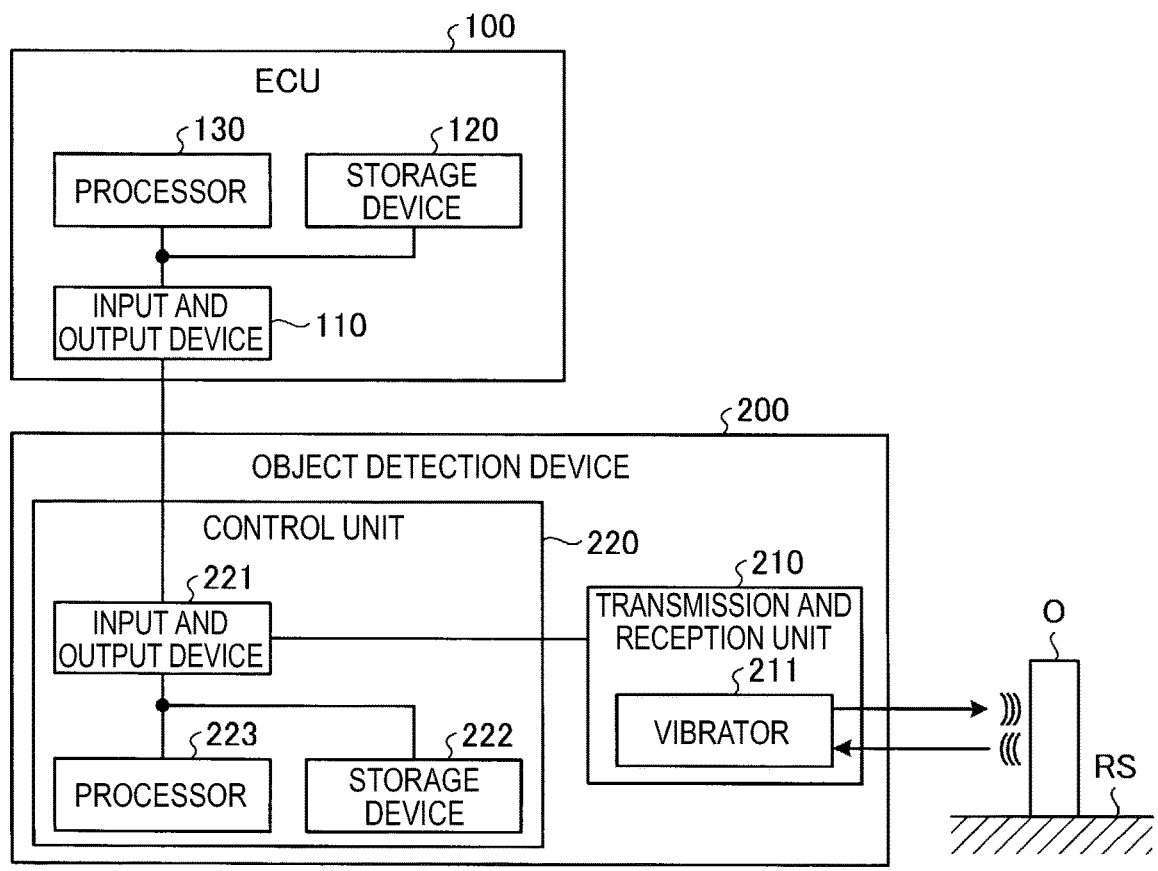
FIG. 2 is an exemplary and schematic block diagram illustrating schematic hardware configurations of an electronic control unit (ECU) and an object detection device according to the embodiment.

FIG. 2 is an exemplary and schematic block diagram illustrating the hardware configurations of the ECU 100 and the object detection device 200 according to the embodiment.

As illustrated in FIG. 2, the ECU 100 has the same hardware configuration as a normal computer. More specifically, the ECU 100 includes an input and output device 110, a storage device 120, and a processor 130.

The input and output device 110 is an interface for realizing transmission and reception of information between the ECU 100 and the outside (object detection device 200 in the example illustrated in FIG. 1).

The storage device 120 is a main storage device such as a read only memory (ROM) or a random access memory (RAM), and/or an auxiliary storage device such as a hard disk drive (HDD) or a solid state drive (SSD).

The processor 130 controls various processing executed in the ECU 100. The processor 130 includes an operation device such as a central processing unit (CPU). The processor 130 realizes various functions such as automatic parking by reading and executing a computer program stored in the storage device 120.

On the other hand, as illustrated in FIG. 2, the object detection device 200 includes a transmission and reception unit 210 and a control unit 220.

The transmission and reception unit 210 includes a vibrator 211 such as a piezoelectric element, and realizes transmission and reception of ultrasonic waves by the vibrator 211.

More specifically, the transmission and reception unit 210 transmits an ultrasonic wave generated according to vibration of the vibrator 211 as a transmission wave, and receives, as a reception wave, the vibration of the vibrator 211 that is caused by the ultrasonic wave transmitted as the transmission wave being reflected by and returned from an object existing outside. In the example illustrated in FIG. 2, the obstacle O installed on a road surface RS is illustrated as an object that reflects the ultrasonic waves from the transmission and reception unit 210.

In the example illustrated in FIG. 2, a configuration in which both transmission of a transmission wave and reception of a reception wave are realized by a single transmission and reception unit 210 including a single vibrator 211. However, the technique of the embodiment is naturally applicable to a configuration in which a configuration on a transmission side and a configuration on a reception side are separated, such as a configuration in which a first vibrator for transmitting a transmission wave and a second vibrator for receiving a reception wave are separately provided.

The control unit 220 has the same hardware configuration as a normal computer. More specifically, the control unit 220 includes an input and output device 221, a storage device 222, and a processor 223.

The input and output device 221 is an interface for realizing transmission and reception of information between the control unit 220 and the outside (ECU 100 and transmission and reception unit 210 in the example illustrated in FIG. 1).

The storage device 222 includes a main storage device such as the ROM and the RAM and/or an auxiliary storage device such as the HDD and the SSD.

The processor 223 controls various processing executed in the control unit 220. The processor 223 includes, for example, an operation device such as a CPU. The processor 223 realizes various functions by reading and executing a computer program stored in the storage device 222.

Here, the object detection device 200 according to the embodiment detects the distance to the object by a technique called a so-called a time of flight (TOF) method. As described in detail below, the TOF method is a technique for calculating the distance to an object as information about the object in consideration of a difference between the timing (more specifically, timing at which the transmission wave begins to be transmitted) at which the transmission wave is transmitted and the timing (more specifically, the reception wave begins to be received) at which the reception wave is received.

Figure 3:
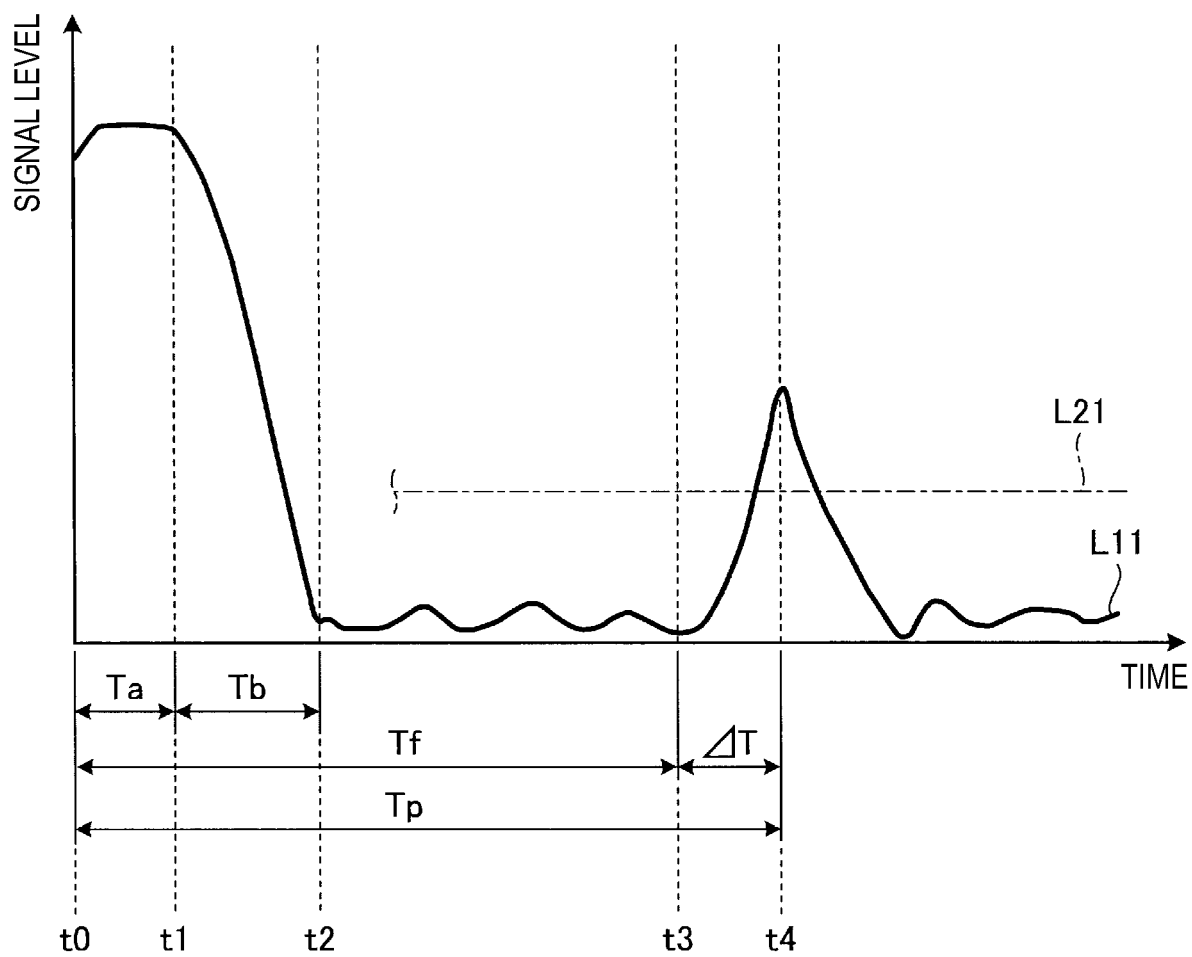
FIG. 3 is an exemplary and schematic diagram for describing an outline of a technique used by the object detection device according to the embodiment to detect a distance to an object.

FIG. 3 is an exemplary and schematic diagram for describing an outline of a technique used by the object detection device 200 according to the embodiment to detect a distance to an object. More specifically, FIG. 3 is a diagram exemplarily and schematically illustrating, in a graph format, a temporal change in a signal level (for example, amplitude) of an ultrasonic wave transmitted and received by the object detection device 200 according to the embodiment. In the graph illustrated in FIG. 3, the horizontal axis corresponds to time, and the vertical axis corresponds to the signal level of the signal transmitted and received by the object detection device 200 via the transmission and reception unit 210 (vibrator 211).

In the graph illustrated in FIG. 3, a solid line L11 represents an example of a signal level of a signal transmitted and received by the object detection device 200, that is, an example of an envelope curve illustrating a temporal change in a degree of vibration of the vibrator 211. From the solid line L11, matters that the vibrator 211 is driven by time Ta from timing t0 and vibrates, so that transmission of the transmission wave is completed at timing t1, and thereafter, during time Tb until timing t2, vibration of the vibrator 211 due to inertia continues while being attenuated can be read. Accordingly, in the graph illustrated in FIG. 3, the time Tb corresponds to so-called reverberation time.

The solid line L11 reaches a peak, where the degree of vibration of the vibrator 211 exceeds (becomes equal to or larger than) a predetermined threshold Th1 represented by the one-dot chain line L21, at timing t4 at which time Tp has elapsed from the timing t0 at which the transmission of the transmission wave starts. The threshold Th1 is a value set in advance to identify whether the vibration of the vibrator 211 is caused by the reception of the reception wave as the transmission wave reflected by and returned from the object that is a detection target (for example, obstacle O illustrated in FIG. 2) or a value set in advance to identify whether the vibration of the vibrator 211 is caused by the reception of the reception wave as the transmission wave reflected by and returned from the object outside the object (for example, road surface RS illustrated in FIG. 2).

Although an example in which the threshold Th1 is set as a constant value that does not change over time is illustrated in FIG. 3, in the embodiment, the threshold Th1 may be set as a value that changes over time.

Here, the vibration having a peak exceeding (or equal to or larger than) the threshold Th1 can be regarded as being caused by the reception of the reception wave as the transmission wave reflected by and returned from the object that is a detection target. On the other hand, the vibration having the peak equal to or less than (or less than) the threshold Th1 can be regarded as being caused by the reception of the reception wave as the transmission wave reflected by and returned from an object other than an object that is a detection target.

Accordingly, from the solid line L11, matters that the vibration of the vibrator 211 at the timing t4 is caused by the reception of the reception wave as the transmission wave reflected by and returned from the object that is a detection target can be read.

On the solid line L11, the vibration of the vibrator 211 is attenuated after the timing t4. Accordingly, the timing t4 corresponds to the timing at which the reception of the reception wave as the transmission wave reflected by and returned from the object that is a detection target is completed, in other words, the timing at which the last transmission wave at timing t1 returns as a reception wave.

In the solid line L11, the timing t3 as the start point of the peak at the timing t4 corresponds to the timing at which the reception of the reception wave as the transmission wave reflected by and returned from the object that is a detection target starts, in other words, the timing at which the transmission wave first transmitted at the timing t0 returns as a reception wave. Accordingly, in the solid line L11, time ΔT between the timing t3 and the timing t4 becomes equal to time Ta as the transmission time of the transmission wave.

Based on the description as above, in order to obtain the distance to the object that is a detection target by the TOF method, it is necessary to obtain time Tf between the timing t0 at which the transmission wave starts to be transmitted and the timing t3 at which the reception wave starts to be received. The time Tf can be obtained by subtracting the time ΔT equal to the time Ta as the transmission time of the transmission wave from the time Tp as a difference between the timing t0 and the timing t4 at which the signal level of the reception wave reaches the peak exceeding the threshold Th1.

The timing t0 at which the transmission wave starts to be transmitted can be easily specified as the timing at which the object detection device 200 starts its operation, and the time Ta as the transmission time of the transmission wave is determined in advance by setting or the like. Accordingly, in order to obtain the distance to the object that is a detection target by the TOF method, it is ultimately important to specify the timing t4 at which the signal level of the reception wave reaches the peak exceeding the threshold Th1. Then, in order to specify the timing t4, it is important to accurately detect the reception wave as the transmission wave reflected by and returned from the object that is a detection target.

By the way, conventionally, in a technique of detecting information about an object based on transmission and reception of waves such as radar and sound waves, constant false alarm rate (CFAR) processing is known as processing for reducing noise called clutter that occurs due to reflection by an object that is not a detection target. CFAR processing is processing for acquiring a difference signal based on a difference between the value (signal level) of the processing target signal according to the reception wave and an average value of the values of the processing target signal. In the existing technique using such CFAR processing, the reception wave as the transmission wave reflected by and returned from the object that is a detection target is detected based on a comparison between a value of the difference signal and a fixed threshold.

Here, in the existing technique as described above, it is desirable that the fixed threshold which is a comparison target of the value of the difference signal obtained as a result of CFAR processing is set to such a magnitude that the reception wave as the transmission wave reflected by and returned from the object that is a detection target is detected but clutter is not detected.

However, in general, the degree of clutter is not constant, and may change variously, for example, depending on the environment such as a state of the road surface on which the object that is a detection target is provided. Accordingly, in the existing technique as described above in which a fixed threshold is used as the comparison target of the value of the difference signal, depending on the environment, not only the reception wave as the transmission wave reflected by and returned from the object that is a detection target but also clutter may be detected.

Therefore, in the embodiment, by configuring the object detection device 200 as follows, it is possible to accurately detect the reception wave as the transmission wave reflected by and returned from the object that is a detection target while appropriately reducing clutter, regardless of the environment.

Figure 4:
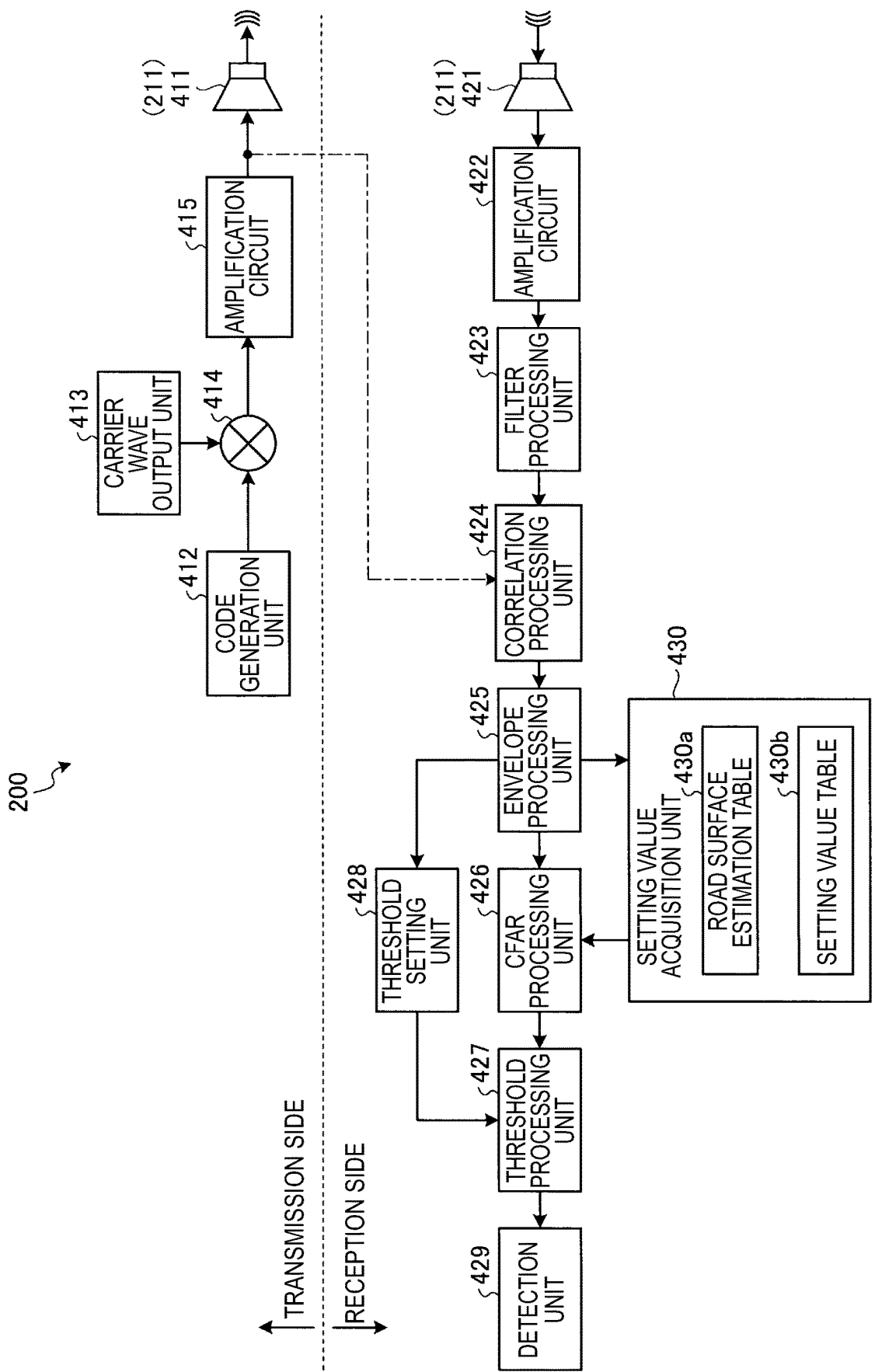
FIG. 4 is an exemplary and schematic block diagram illustrating a detailed configuration of the object detection device according to the embodiment.

FIG. 4 is an exemplary and schematic block diagram illustrating a detailed configuration of the object detection device 200 according to the embodiment. In the example illustrated in FIG. 4, the configuration on the transmission side and the configuration on the reception side are separated, but such an illustrated mode is merely for convenience of description. Accordingly, in the embodiment, as described above, both the transmission of the transmission wave and the reception of the reception wave are realized by the single transmission and reception unit 210 including the single vibrator 211. However, although the description as above is repeated, the technique of the embodiment is naturally applicable to a configuration in which the configuration on the transmission side and the configuration on the reception side are separated.

As illustrated in FIG. 4, the object detection device 200 includes a wave transmitter 411, a code generation unit 412, a carrier wave output unit 413, a multiplier 414, and an amplification circuit 415, as the transmission side configuration. The wave transmitter 411 is an example of a "transmission unit".

The object detection device 200 includes a wave receiver 421, an amplification circuit 422, a filter processing unit 423, a correlation processing unit 424, an envelope processing unit 425, a CFAR processing unit 426, a threshold processing unit 427, a threshold setting unit 428, a detection unit 429, and a setting value acquisition unit 430, as the reception side configuration. The wave receiver 421 is an example of a "reception unit", and the CFAR processing unit 426 is an example of a "signal processing unit".

In the embodiment, at least a part of the configuration illustrated in FIG. 4 can be realized by dedicated hardware (analog circuit), and the remaining part can be realized as a result of the cooperation of hardware and software, more specifically, as a result of the processor 223 of the object detection device 200 reading and executing the computer program from the storage device 222. In the embodiment, each configuration illustrated in FIG. 4 may operate under control of the control unit 220 of the object detection device 200 itself, or may operate under control of an external ECU 100.

First, the configuration on the transmission side will be briefly described.

The wave transmitter 411 is configured by the vibrator 211 described above, and transmits a transmission wave according to a transmission signal (after amplification) output from the amplification circuit 415 by the vibrator 211.

Here, in the embodiment, based on the configuration described below, the wave transmitter 411 transmits the encoded transmission wave after encoding the transmission wave so as to include identification information of a predetermined code length.

The code generation unit 412 generates a signal corresponding to identification information to be added to the transmission wave, for example, a pulse signal corresponding to a code of a bit string consisting of a sequence of 0 or 1 bits.

The carrier wave output unit 413 outputs a carrier wave as a signal to which identification information is to be added. For example, the carrier wave output unit 413 outputs a sine wave having a predetermined frequency as a carrier wave.

The multiplier 414 executes modulation of the carrier wave so as to add identification information by multiplying the output from the code generation section 412 and the output from the carrier wave output unit 413. As a modulation method, a plurality of methods such as phase modulation, amplitude modulation, and frequency modulation can be used alone or in combination of one or more of the plurality of methods. Then, the multiplier 414 outputs the modulated carrier wave, to which the identification information is added, to the amplification circuit 415 as a transmission signal that is a source of the transmission wave.

The amplification circuit 415 amplifies the transmission signal output from the multiplier 414 and outputs the amplified transmission signal to the wave transmitter 411.

Next, the configuration on the reception side will be briefly described.

The wave receiver 421 is configured by the vibrator 211 described above, and receives the transmission wave reflected by the object as a reception wave by the vibrator 211.

The amplification circuit 422 amplifies the received signal as a signal according to the reception wave received by the wave receiver 421.

The filter processing unit 423 performs filtering processing on the reception signal amplified by the amplification circuit 422 to reduce noise. In the embodiment, the filter processing unit 423 may acquire information about a frequency of the transmission signal and further perform frequency correction on the reception signal so as to match the frequency of the transmission signal.

The correlation processing unit 424 acquires a correlation value corresponding to the degree of similarity of the identification information between the transmission wave and the reception wave, for example, based on the transmission signal acquired from the configuration on the transmission side and the reception signal after processing by the filter processing unit 423. The correlation value can be obtained based on a generally well-known correlation function or the like.

The envelope processing unit 425 obtains an envelope of a waveform of the correlation value signal as a signal based on the correlation value acquired by the correlation processing unit 424, and outputs the signal to the CFAR processing unit 426 as the processing target signal.

The CFAR processing unit 426 acquires a difference signal by performing CFAR processing on the processing target signal output from the envelope processing unit 425. As described above, in outline, CFAR processing is processing for acquiring a difference signal based on the difference between the value (signal level) of the processing target signal and an average value of values of the processing target signal, in order to reduce clutter contained in the processing target signal.

The CFAR processing unit 426 according to the embodiment samples the processing target signal according to the reception wave and acquires the difference signal based on the difference between a value of the processing target signal for (at least) one sample according to the reception wave received at a certain detection timing, and an average value of the values of the processing target signal for a plurality of samples according to the reception wave received in at least one of a first period and a second period of a predetermined time length that exist before and after the detection timing, by executing CFAR processing.

As CFAR processing, a plurality of processing having different properties such as cell averaging constant false alarm rate (CA-CFAR) processing, greatest of constant false alarm rate (GO-CFAR) processing, smallest of constant false alarm rate (SO-CFAR) processing can be considered. In this regard, the CFAR processing unit 426 according to the embodiment selectively executes the plurality of types of CFAR processing according to settings so that at least CA-CFAR processing and GO-CFAR processing are used properly. Details of CA-CFAR processing and GO-CFAR processing will be described later in detail, and thus the description thereof is omitted here.

The threshold processing unit 427 compares the value of the difference signal acquired by the CFAR processing unit 426 with the threshold, and determines whether or not the identification information of the transmission wave and the reception wave are similar to each other at a predetermined level or higher based on the comparison result.

Here, as described above, if a fixed threshold is used as a comparison target of the value of the difference signal, depending on the environment, not only the reception wave as the transmission wave reflected by and returned from the object that is a detection target but also clutter may be detected.

Therefore, in order to eliminate inconvenience described above, the threshold processing unit 427 according to the embodiment uses a threshold dynamically set by the threshold setting unit 428 according to the environment as a comparison target with the value of the difference signal.

That is, the threshold setting unit 428 according to the embodiment dynamically sets an appropriate threshold according to the environment in consideration of the variation in the value of the processing target signal which is a target of CFAR processing. More specifically, the threshold setting unit 428 sets a threshold as a comparison target with the value of the difference signal, based on the variation in the value of the processing target signal for a plurality of samples according to the reception wave received in at least one of a first period and a second period of a predetermined time length that exist before and after the detection timing described above. Although details will be described later, an indicator indicating variation is calculated based on different criteria depending on the type of CFAR processing executed by the CFAR processing unit 426.

Then, the detection unit 429 specifies the timing at which the degree of similarity of the identification information between the transmission wave and the reception wave reaches a predetermined level or more, that is, the timing (for example, timing t4 illustrated in FIG. 2) at which the signal level of the reception wave as the transmission wave returned by reflection reaches the peak exceeding the threshold based on the processing result by the threshold processing unit 427, and detects the distance to the object by the TOF method.

Here, an outline of CFAR processing and the threshold setting processing executed in the embodiment will be described. As described above, the CFAR processing unit 426 according to the embodiment selectively executes the plurality types of CFAR processing according to settings so that at least CA-CFAR processing and GO-CFAR processing are used properly. Then, the threshold setting unit 428 according to the embodiment calculates the indicator indicating the variation in the value of the processing target signal by different criteria according to the type of CFAR processing executed by the CFAR processing unit 426, and based on the arithmetic result, dynamically sets the threshold according to the environment such as a condition of the road surface that causes clutter.

First, CA-CFAR processing and the threshold setting processing based on CA-CFAR processing will be described.

Figure 5:
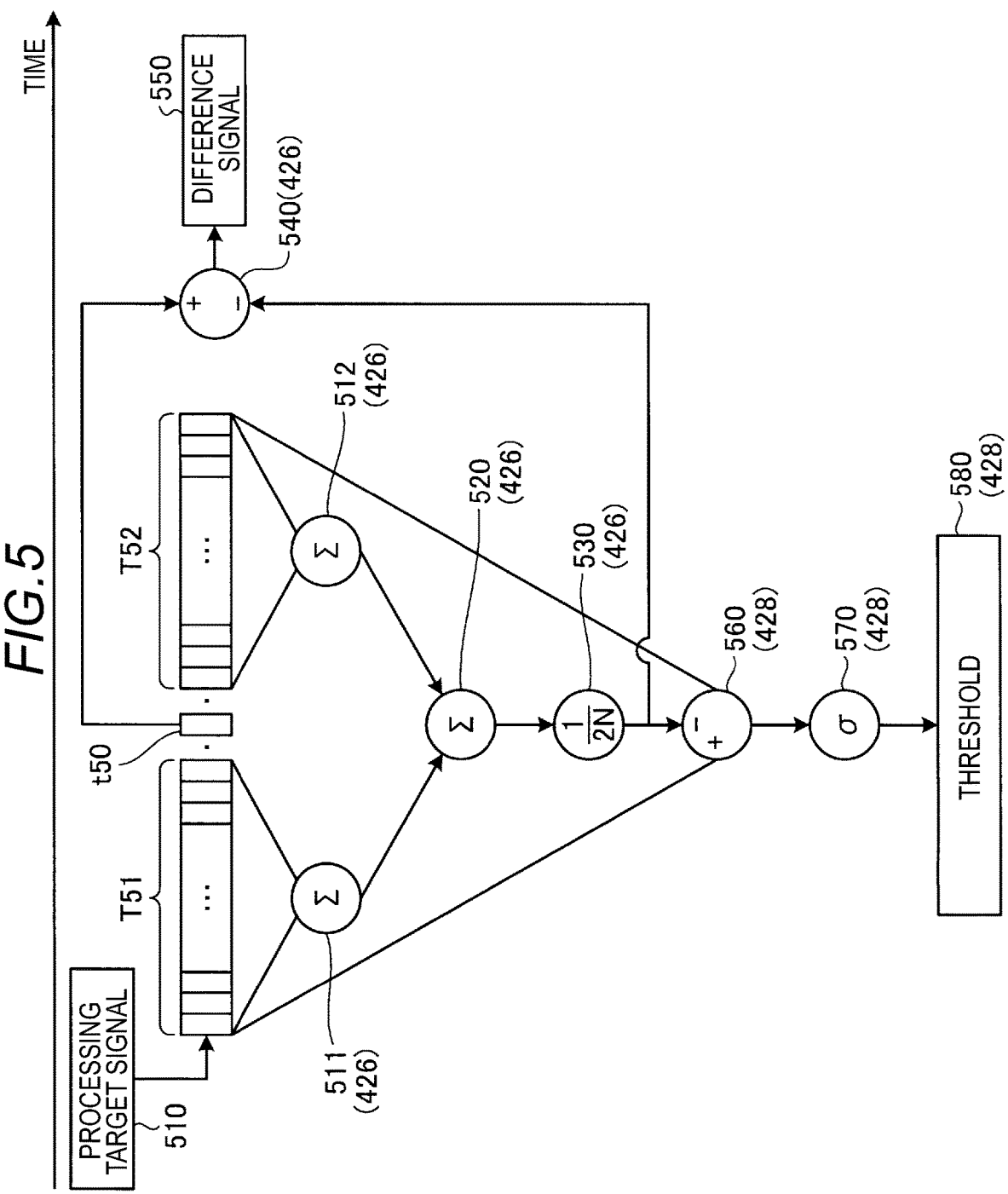
FIG. 5 is an exemplary and schematic diagram for describing an outline of cell averaging constant false alarm rate (CA-CFAR) processing and threshold setting processing that can be executed in the embodiment.

As illustrated in FIG. 5 below, CA-CFAR processing is processing for acquiring a difference signal based on a difference between the value of the processing target signal for one sample according to the reception wave received at a certain detection timing and an average value of values of the processing target signal for a plurality of samples according to the reception wave received in both the first period and the second period that exist before and after the detection timing.

FIG. 5 is an exemplary and schematic diagram for describing an outline of CA-CFAR processing that can be executed in the embodiment and the threshold setting processing based on CA-CFAR processing.

As illustrated in FIG. 5, in CA-CFAR processing, first, a processing target signal 510 is sampled at predetermined time intervals. Then, a arithmetic unit 511 of the CFAR processing unit 426 calculates a total sum of values of processing target signals for N samples according to a reception wave received in a first period T51 existing before a certain detection timing t50. An arithmetic unit 512 of the CFAR processing unit 426 calculates a total sum of values of processing target signals for N samples according to a reception wave received in a second period T52 existing after the detection timing t50.

Then, an arithmetic unit 520 of the CFAR processing unit 426 adds up arithmetic results of the arithmetic units 511 and 512. Then, an arithmetic unit 530 of the CFAR processing unit 426 divides the arithmetic result of the arithmetic unit 520 by 2N, which is the sum of the sample number N of the processing target signal in the first period T51 and the sample number N of the processing target signal in the second period T52 and calculates an average value of the values of the processing target signal in both the first period T51 and the second period T52.

Then, an arithmetic unit 540 of the CFAR processing unit 426 subtracts the average value as the arithmetic result of the arithmetic unit 530 from the value of the processing target signal at the detection timing t50 and acquires a difference signal 550.

On the other hand, an arithmetic unit 560 of the threshold setting unit 428 subtracts the average value as the arithmetic result of the arithmetic unit 530 from the respective values of the processing target signals for 2N samples in the first period T51 and the second period T52. Then, an arithmetic unit 570 of the threshold setting unit 428 computes a square root of a square of the total sum of the arithmetic results for 2N samples of the arithmetic unit 560 divided by 2N to calculate a standard deviation as an indicator indicating the variation in the value of the processing target signal in both the first period T51 and the second period T52. Then, the threshold setting unit 428 sets a threshold 580 which is a comparison target of the difference signal 550 by executing processing such as multiplying the arithmetic result of the arithmetic unit 570 by a predetermined gain.

In the example illustrated in FIG. 5, the first period T51 and the second period T52 may be set before and after the detection timing t50 without a time gap, or may be set before and after the detection timing t50 with a time interval of several samples. According to the latter setting, it is possible to obtain a processing result that emphasizes information at the detection timing t50 by ignoring information immediately before and after the detection timing t50.

Next, the GO-CFAR processing and the threshold setting processing based on the GO-CFAR processing will be described.

Figure 6:
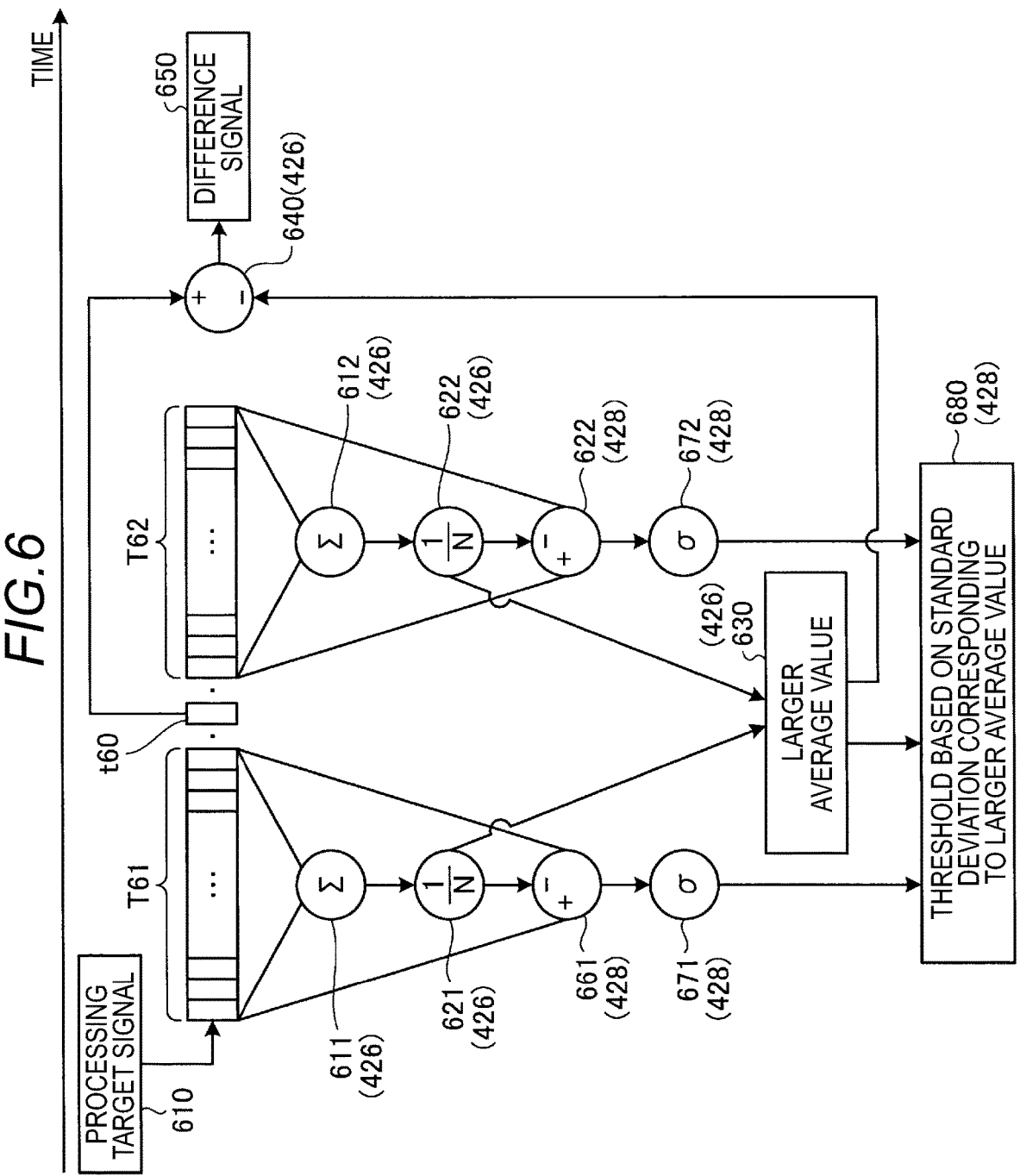
FIG. 6 is an exemplary and schematic diagram for describing an outline of greatest of constant false alarm rate (GO-CFAR) processing and the threshold setting processing that can be executed in the embodiment.

As illustrated in FIG. 6 below, the GO-CFAR processing is processing for acquiring the difference signal based on a difference between the value of the processing target signal for one sample according to the reception wave received at a certain detection timing and a larger average value of an average value of the values of the first processing target signal for a plurality of samples according to the reception wave received in the first period that exists before the detection timing and an average value of the values of the processing target signal for a plurality of samples according to the reception wave received in the second period that exists after the detection timing.

FIG. 6 is an exemplary and schematic diagram for describing an outline of GO-CFAR processing that can be executed in the embodiment and the threshold setting processing based on GO-CFAR processing.

As illustrated in FIG. 6, also in GO-CFAR processing, similar to CA-CFAR processing, first, a processing target signal 610 is sampled at predetermined time intervals. Then, an arithmetic unit 611 of the CFAR processing unit 426 calculates a total sum of the values of the processing target signals for N samples according to a reception wave received in a first period T61 existing before a certain detection timing t60. An arithmetic unit 612 of the CFAR processing unit 426 calculates the total sum of the values of the processing target signals for a plurality of N samples according to a reception wave received in a second period T62 existing after the detection timing t60.

Then, the arithmetic unit 621 of the CFAR processing unit 426 divides the arithmetic result of the arithmetic unit 611 by the number of samples N of the processing target signal in the first period T61, and calculates an average value of the values of the processing target signal in the first period T61. An arithmetic unit 622 of the CFAR processing unit 426 divides the arithmetic result of the arithmetic unit 612 by the number of samples N of the processing target signal in the second period T62, and calculates an average value of the values of the processing target signal in the second period T62.

Then, the CFAR processing unit 426 extracts a larger average value 630 of the average value as the arithmetic result of the arithmetic unit 621 and the average value as the arithmetic result of the arithmetic unit 622. Then, an arithmetic unit 640 of the CFAR processing unit 426 subtracts the extracted larger average value 630 from the value of the processing target signal at the detection timing t50 to acquire a difference signal 650.

On the other hand, an arithmetic unit 661 of the threshold setting unit 428 subtracts the average value as the arithmetic result of the arithmetic unit 621 from each of the processing target signals for N samples in the first period T61. Then, an arithmetic unit 671 of the threshold setting unit 428 computes a square root of a square of the arithmetic result of N samples of the arithmetic unit 661 divided by N to calculate a standard deviation as an indicator indicating the variation in the value of the processing target signal in the first period T61.

An arithmetic unit 662 of the threshold setting unit 428 subtracts the average value as the arithmetic result of the arithmetic unit 622 from each of the processing target signals for N samples in the second period T62. Then, an arithmetic unit 672 of the threshold setting unit 428 computes a square root of a square of the arithmetic result of N samples of the arithmetic unit 662 divided by N to calculate a standard deviation as an indicator indicating the variation in the value of the processing target signal in the second period T62.

Then, the threshold setting unit 428 extracts the standard deviation corresponding to the larger average value 630 extracted by the CFAR processing unit 426, of the standard deviation as the arithmetic result of the arithmetic unit 661 and the standard deviation as the arithmetic result of the arithmetic unit 662. Then, the threshold setting unit 428 executes processing such as multiplying the extraction result by a predetermined gain, and sets a threshold 680 based on the standard deviation corresponding to the larger average value 630 as the comparison target of the difference signal 550.

Also in the example illustrated in FIG. 6, similarly as in the example illustrated in FIG. 5, the first period T61 and the second period T62 may be set before and after the detection timing t60 without a time gap, or may be set before and after the detection timing t60 with a time interval of several samples.

In this way, the CFAR processing unit 426 according to the embodiment selectively executes a plurality of types of CFAR processing according to the settings so that at least CA-CFAR processing and GO-CFAR processing are used properly. Then, the threshold setting unit 428 according to the embodiment calculates the indicator indicating the variation in the value of the processing target signal by different criteria according to the type of CFAR processing executed by the CFAR processing unit 426 and dynamically sets the threshold according to the environment such as the condition of the road surface that causes clutter, based on the arithmetic result.

In the description above, although SO-CFAR processing is also referred to, the SO-CFAR processing is basically the same as GO-CFAR processing except that the smaller one of the value for the first period and the value for the second period is extracted, and thus, further description is omitted here.

Hereinafter, the difference signal obtained as a result of CFAR processing will be described in more detail.

First, two signals that are the source of a difference signal will be described by illustrating examples of specific waveforms.

Figure 7:
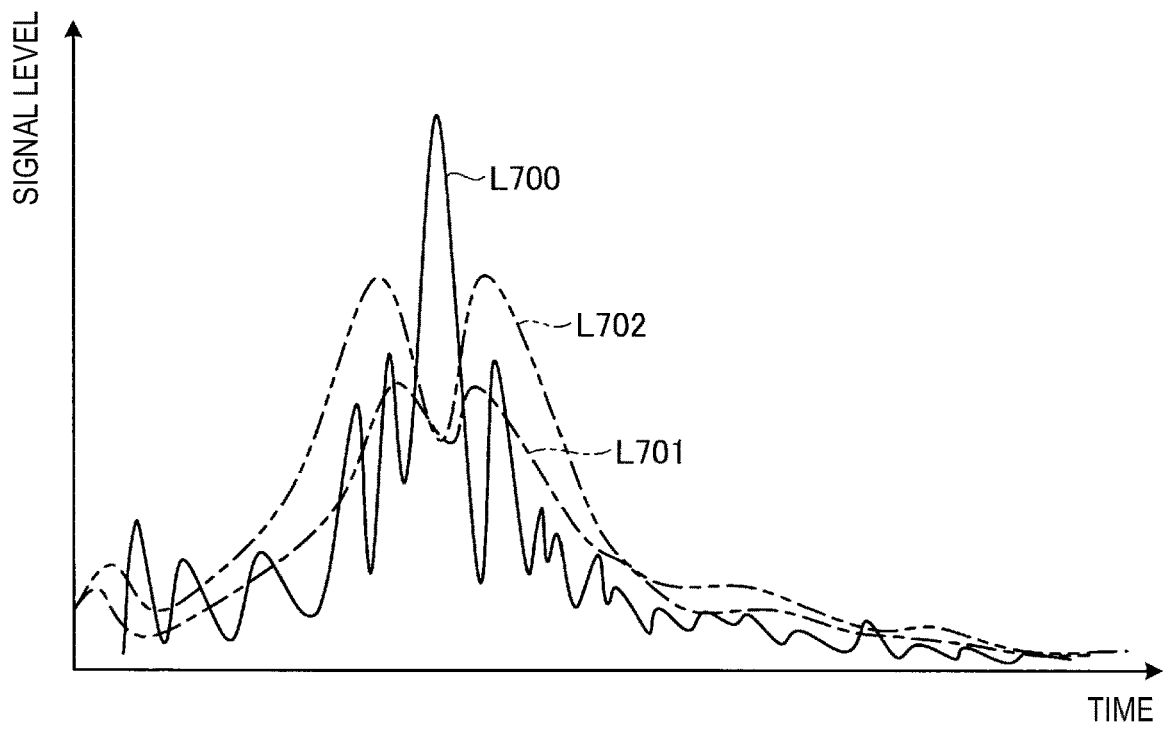
FIG. 7 is an exemplary and schematic diagram illustrating an example of a signal which is a source of a difference signal obtained as a result of CFAR processing according to the embodiment.

FIG. 7 is an exemplary and schematic diagram illustrating an example of a signal that is a source of a difference signal obtained as a result of CFAR processing according to the embodiment.

In the example illustrated in FIG. 7, a solid line L700 indicates an example of the temporal change in the value of the processing target signal as one of the signals that is the source of the difference signal, more specifically, the time change in the value (signal level) of the signal input to the +side of the arithmetic unit 540 at each detection timing t50 in the example illustrated in FIG. 5 and the signal input to the +side of the arithmetic unit 640 at each detection timing t60 in the example illustrated in FIG. 6.

In the example illustrated in FIG. 7, a one-dot chain line L701 indicates an example of a temporal change in the value of the processing target signal which is the target of subtraction from the processing target signal in CA-CFAR processing, more specifically, the temporal change in the value of the signal input to the −side of the arithmetic unit 540 in the example illustrated in FIG. 5. A two-dot chain line L702 indicates an example of a temporal change in the value of the processing target signal which is the target of subtraction from the processing target signal in GO-CFAR processing, more specifically, the temporal change in the value of the signal input to the −side of the arithmetic unit 640 in the example illustrated in FIG. 6.

In the embodiment, when CA-CFAR processing is executed, the difference signal at each time is acquired by subtracting the value of the signal indicated by the one-dot chain line L701 from the value (signal level) of the signal indicated by the solid line L700 at each time, and when GO-CFAR processing is executed, the difference signal is acquired by subtracting the value of the signal indicated by the two-dot chain line L702 from the value of the signal indicated by the solid line L700 at each time.

In the embodiment, the value of the difference signal is not a negative value and is always processed to be a value of zero or more. Accordingly, in the embodiment, for example, in a section in which the value indicated by the one-dot chain line L701 (same for the two-dot chain line L702) is larger than the value of the signal indicated by the solid line L700, the value of the difference signal is calculated as zero without being calculated as a negative value. Needless to say, in a section in which the value of the signal indicated by the solid line L700 is equal to or less than the value indicated by the one-dot chain line L701 (same for the two-dot chain line L702), the value of the difference signal is calculated as a value of zero or more.

Figure 8:
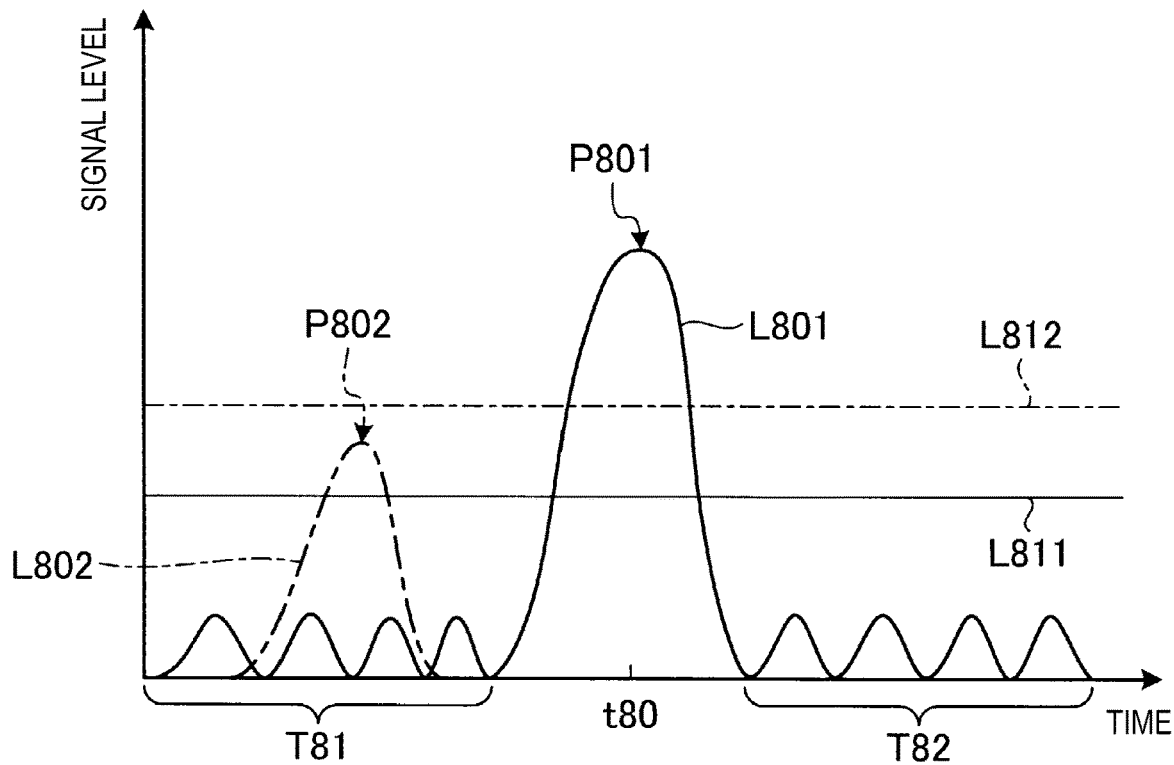
FIG. 8 is an exemplary and schematic diagram illustrating an example of a difference signal obtained as a result of CFAR processing according to the embodiment.

Based on the computation described above, in the embodiment, the temporal change in the value (signal level) of the difference signal is, for example, in a form as illustrated in FIG. 8 below.

FIG. 8 is an exemplary and schematic diagram illustrating an example of a difference signal obtained as a result of CFAR processing according to the embodiment.

In the example illustrated in FIG. 8, a solid line L801 indicates an example of the temporal change in the value of the difference signal. As illustrated by the solid line L801, the value of the difference signal reaches a peak P801 at a certain time t80, and fluctuates in a value range smaller than the peak P801 in periods T81 and T82 before and after the time t80.

The time t80 corresponds to the timing at which the signal level of the reception wave as the transmission wave reflected by and returned from the object that is a detection target, which is extracted as a result of clutter reduction by CFAR processing, reaches a peak (the timing t4 illustrated in FIG. 3) and the periods T81 and T82 correspond to clutter that is reduced by CFAR processing and that occurs due to the reflection of the road surface or the like.

Here, in the embodiment, as described above, at least two CFAR processing, that is, CA-CFAR processing and GO-CFAR processing are used separately, but in FIG. 8, only one example of the change in the value of the difference signal is illustrated by the solid line L801. However, as will be described below, in the embodiment, since the difference signal indicating a temporal change as illustrated by the solid line L801 can be obtained by both CA-CFAR processing and GO-CFAR processing, in FIG. 8, the difference signal obtained as a result of GO-CFAR processing and the difference signal obtained as a result of CA-CFAR processing are illustrated without distinction.

More specifically, as illustrated in FIG. 7, the value of the signal (see one-dot chain line L701) which is the target of subtraction from the processing target signal (see solid line L700) in CA-CFAR processing and the value of the signal (two-dot chain line L702) which is the target of subtraction from the processing target signal (see solid line L700) in GO-CFAR processing indicate substantially the same temporal change except that the former tends to be smaller than the latter. Accordingly, a difference signal indicating substantially the same temporal change can be obtained by both CA-CFAR processing and GO-CFAR processing.

However, as described above, in GO-CFAR processing, a value larger than that in CA-CFAR processing tends to be subtracted from the value of the processing target signal, and thus the difference signal obtained as a result of GO-CFAR processing tends to have a zero value for a longer time than the difference signal obtained as a result of CA-CFAR processing.

In the example illustrated in FIG. 8, if the threshold illustrated by a solid line L811 is set, it is possible to detect the time t80, at which the value of the difference signal reaches the peak P801 and which corresponds to the timing at which the signal level of the reception wave as the transmission wave reflected by and returned from the object that is a detection target reaches the peak, without detecting periods T81 and T82 corresponding to clutter.

Here, although the description as above is repeated, when the degree of clutter does not change, even if a fixed threshold is used as the threshold described above, no particular inconvenience occurs. However, the degree of clutter is not constant and may change variously depending on the environment, and thus, depending on the environment, for example, as in the example illustrated in FIG. 8, a value (signal level) of clutter in the period T81 may reach a peak P802 larger than a threshold illustrated by the solid line L811 such as a one-dot chain line L812 illustrated in FIG. 8. In such a case, if the threshold indicated by the solid line L811 is not changed, not only the peak P801 which is the original detection target but also the peak P802 corresponding to clutter will be detected.

Therefore, in the embodiment, the threshold setting unit 428 dynamically sets an appropriate threshold according to the environment in consideration of the variation in the value of the processing target signal that is the target of CFAR processing, as described above. Since the variation in the value of the processing target signal affects the degree of clutter, if the threshold is dynamically set (changed) in consideration of the variation, it is possible to appropriately set the threshold that detects only the original detection target and does not detect clutter.

For example, in the example illustrated in FIG. 8, in an environment in which a clutter value reaches the peak P802 in the period T81, the threshold setting unit 428 sets a threshold indicated by the one-dot chain line L812 so as to correspond to the environment. Since the threshold indicated by the one-dot chain line L812 is larger than the peak P802, according to the threshold indicated by the one-dot chain line L812, it is possible to accurately detect only the original detection target without detecting clutter.

By the way, as described above, the difference signal at a certain detection timing is acquired based on a value obtained by subtracting the average value of the values of the processing target signal in at least one period before and after the detection timing from the value of the processing target signal at the detection timing. Then, when the value of the processing target signal is smaller than the average value, the value of the difference signal is calculated as zero. Based on this, if a computation method for acquiring the difference signal is adjusted so that a value equal to or larger than a setting value having a magnitude of zero or greater as illustrated in the following FIG. 9 is always subtracted from the value of the processing target signal, the time during which the value of the difference signal becomes zero can be lengthened, and clutter reduction can be effectively realized.

Figure 9:
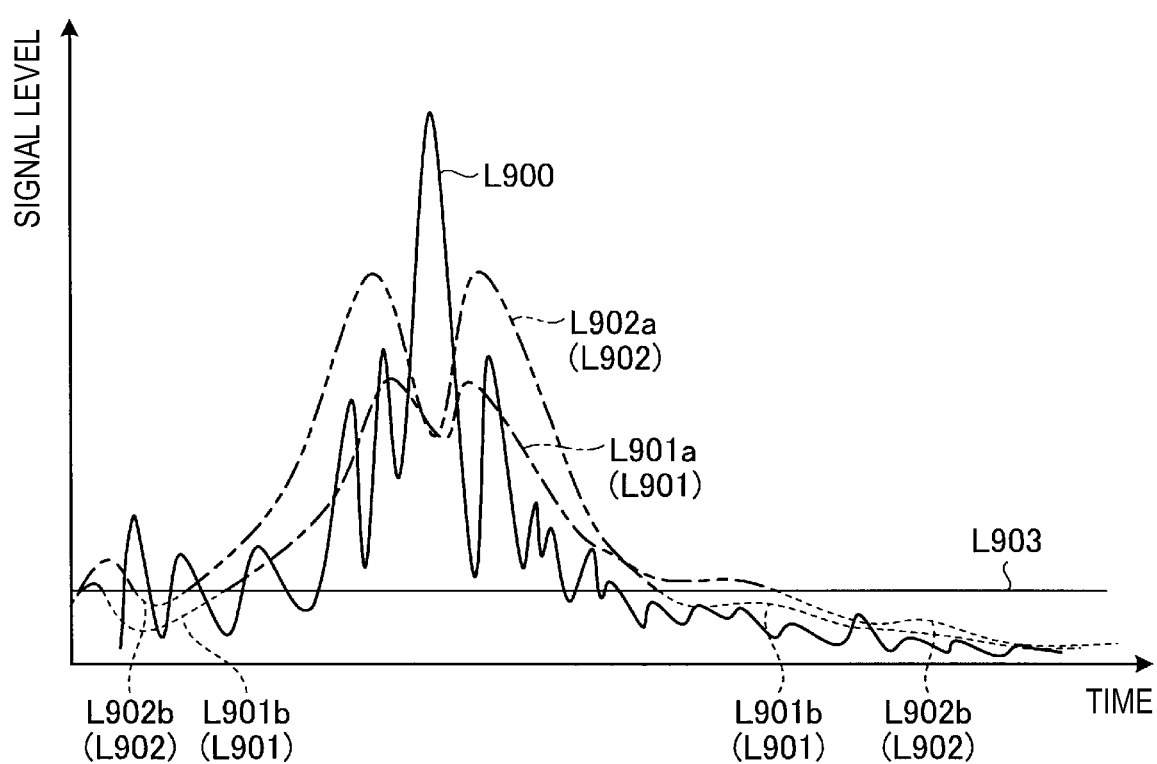
FIG. 9 is an exemplary and schematic diagram for describing a setting value that can be set in the embodiment.

FIG. 9 is an exemplary and schematic diagram for describing setting values that can be set in the embodiment.

In the example illustrated in FIG. 9, a solid line L900 indicates an example of a temporal change in the value (signal level) of the processing target signal. A line L901 composed of a one-dot chain line L901a and a broken line L901b illustrates an example of a temporal change in the value of the signal which is the target of subtraction from the processing target signal in order to acquire the difference signal in CA-CFAR processing. A line L902 composed of a two-dot chain line L902a and a broken line L902b illustrates an example of a temporal change in the value of the signal which is the target of subtraction from the processing target signal in order to acquire the difference signal in GO-CFAR processing. A solid line L903 illustrates an example of setting values for lengthening the time during which the value of the difference signal becomes zero to effectively realize clutter reduction.

Similar to the example described above, in the example illustrated in FIG. 9, a basic computation method for acquiring the difference signal is to subtract the value illustrated by the line L901 or L902 from the value illustrated by the solid line L900. However, in the embodiment, in order to effectively realize clutter reduction by lengthening the time during which the value of the difference signal becomes zero, the computation method for acquiring the difference signal is adjusted based on the setting value such that a value equal to or larger than the setting value indicated by the solid line L903 is always subtracted from the value indicated by the solid line L900. The setting value is smaller than the peak of the value indicated by the solid line L900, but is set to be larger than the value of the foot portion that fluctuates in a small value range closer to zero than the peak.

That is, in the example illustrated in FIG. 9, the difference signal based on CA-CFAR processing is acquired based on the result of subtracting the value indicated by the one-dot chain line L901a from the value indicated by the solid line L900 in a section in which the value indicated by the line L901 is the value indicated by the one-dot chain line L901a that exceeds the setting value indicated by the solid line L903, and is acquired based on the result of subtracting the value indicated by the solid line L903 from the value indicated by the solid line L900 in a section in which the value indicated by the line L901 is the value indicated by the broken line L901b that is equal to or less than the setting value indicated by the solid line L903.

Similarly, in the example illustrated in FIG. 9, the difference signal based on GO-CFAR processing is acquired based on the result of subtracting the value indicated by the two-dot chain line L902a from the value indicated by the solid line L900 in a section in which the value indicated by the line L902 is the value indicated by the two-dot chain line L902a that exceeds the setting value indicated by the solid line L903, and is acquired based on the result of subtracting the value indicated by the solid line L903 from the value indicated by the solid line L900 in a section in which the value indicated by the line L902 is the value indicated by the two-dot chain line L902b that is equal to or less than the setting value indicated by the solid line L903.

Here, in the example illustrated in FIG. 9, the setting value illustrated by the solid line L903 is illustrated as a fixed value. However, a degree of fluctuation of the value indicated by the solid line L900 differs depending on a shape of the road surface. That is, depending on the shape of the road surface, a situation in which the value indicated by L900 constantly changes to exceed the setting value indicated by the solid line L903 may occur, and thus the setting value needs to be dynamically set according to the shape of the road surface.

Then, returning to FIG. 2, in the embodiment, the wave transmitter 411 transmits the transmission wave for estimating the shape of the road surface before transmitting the transmission wave for distance detection by the TOF method as described above. Then, the setting value acquisition unit 430 acquires the setting value based on the processing target signal output from the envelope processing unit 425 according to the reception wave received by the wave receiver 421, that is, the transmission wave for estimating the road surface shape, which is returned by reflection.

The transmission wave for distance detection and the transmission wave for estimating the shape of the road surface are basically the same wave from the viewpoint of whether or not encoding is performed, but in the following, in order to clearly distinguish the two transmission waves, the transmission wave for distance detection may be referred to as a first transmission wave, and the transmission wave for estimating the shape of the road surface may be referred to as a second transmission wave, if necessary. The reception wave as a result of the first transmission wave returning by reflection may be referred to as a first reception wave, and the reception wave as a result of the second transmission wave returning by reflection may be referred to as a second reception wave. Furthermore, the processing target signal corresponding to the first reception wave may be referred to as a first processing target signal, and the processing target signal corresponding to the second reception wave may be referred to as a second processing target signal.

In the embodiment, the setting value acquisition unit 430 estimates the shape of the road surface by referring to a road surface estimation table 430a based on information about the second processing target signal according to the second reception wave and acquires the setting value according to the shape of the road surface by referring to a setting value table 430b based on the estimation result. The road surface estimation table 430a is an example of "first setting information", and the setting value table 430b is an example of "second setting information".

More specifically, if the setting value acquisition unit 430 acquires the second processing target signal, the setting value acquisition unit 430 specifies an empirical formula that most closely approximates the second processing target signal. Such an empirical formula is selected by computing a coincidence degree with each of a plurality of empirical formulas set in advance. The target of approximation by the empirical formula is not the entire section of the second processing target signal, but a part of the specific section in which the second reception wave as the second transmission wave reflected by and returned from the object, which is other than a detection target, such as road surfaces, which is estimated according to an installation position and installation attitude of the object detection device 200, is received.

Then, when the empirical formula that best approximates the second processing target signal (a part of the specific section among the sections of the temporal change) is specified, the setting value acquisition unit 430 calculates an indicator (for example, standard deviation) indicating the variation in the difference between the value of the signal and the value of the second processing target signal represented by the empirical formula. The setting value acquisition unit 430 also calculates the average characteristic based on the moving average of the values of the second processing target signal.

Figure 10:
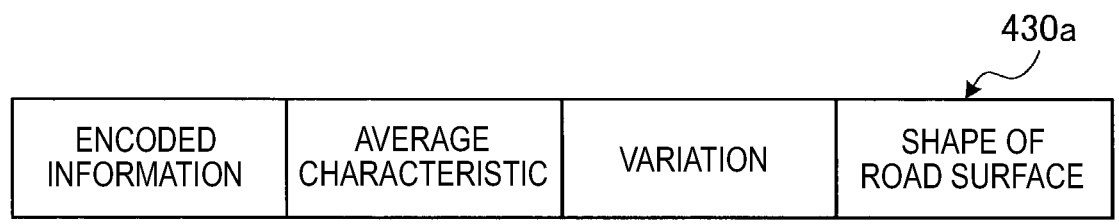
FIG. 10 is an exemplary and schematic diagram illustrating an example of a data structure of a road surface estimation table used for estimating a shape of a road surface in the embodiment.

The setting value acquisition unit 430 estimates the shape of the road surface by referring to the road surface estimation table 430a having a data structure illustrated in FIG. 10 by considering encoded information indicating whether or not the second transmission wave and the second reception wave are encoded as information about second processing target signal, in addition to the average characteristic and the variations calculated by the computation described above. The encoded information is known in advance when the second transmission wave is transmitted.

FIG. 10 is an exemplary and schematic diagram illustrating an example of a data structure of the road surface estimation table 430a used for estimating the shape of the road surface in the embodiment.

In the embodiment, as illustrated in FIG. 10, the road surface estimation table 430a is data indicating a correspondence relationship between the encoded information indicating whether or not the second transmission wave and the second reception wave are encoded, the average characteristic based on the moving average of the values of the second processing target signal, variation in the difference between the value of the signal expressed by the empirical formula, of the plurality of empirical formulas set in advance, that best approximates the second processing target signal (part of a specific section among the sections of the temporal change) and the value of the second processing target signal, and the shape of the road surface. The road surface estimation table 430a is stored in advance in the setting value acquisition unit 430 as fixed data determined by an experiment or the like.

Accordingly, when the encoded information that is known in advance at the time of transmitting the second transmission wave is specified and the average characteristic and the variation calculated according to the reception of the second reception wave are specified, the setting value acquisition unit 430 can estimate an appropriate shape of the road surface by referring to the road surface estimation table 430a based on the specified result.

Figure 11:
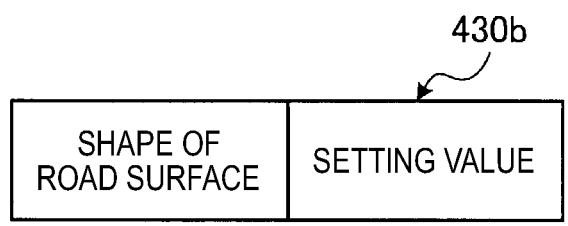
FIG. 11 is an exemplary and schematic diagram illustrating an example of a data structure of a setting value table used for acquiring the setting value in the embodiment.

Then, when the estimation of the shape of the road surface based on the road surface estimation table 430a is completed, the setting value acquisition unit 430 refers to the setting value table 430b having a data structure illustrated in FIG. 11 and acquires a setting value according to the shape of the road surface.

FIG. 11 is an exemplary and schematic diagram illustrating an example of the data structure of the setting value table 430b used for acquiring the setting values in the embodiment.

As illustrated in FIG. 11, in the embodiment, the setting value table 430b is data indicating the correspondence relationship between the shape of the road surface and the setting value. The setting value table 430b is stored in advance in the setting value acquisition unit 430 as fixed data determined by an experiment or the like.

Accordingly, if the setting value acquisition unit 430 estimates the shape of the road surface by referring to the road surface estimation table 430a, the setting value acquisition unit 430 can acquire the appropriate setting value by further referring to the setting value table 430b based on the estimation result.

Returning to FIG. 2, the setting value acquisition unit 430 outputs the setting values acquired based on the road surface estimation table 430a and the setting value table 430b to the CFAR processing unit 426. With this configuration, the setting value is taken into consideration when the difference signal is acquired by the CFAR processing unit 426, and the difference signal with effectively reduced clutter can be acquired.

A flow of processing executed in the embodiment will be described below.

Figure 12:
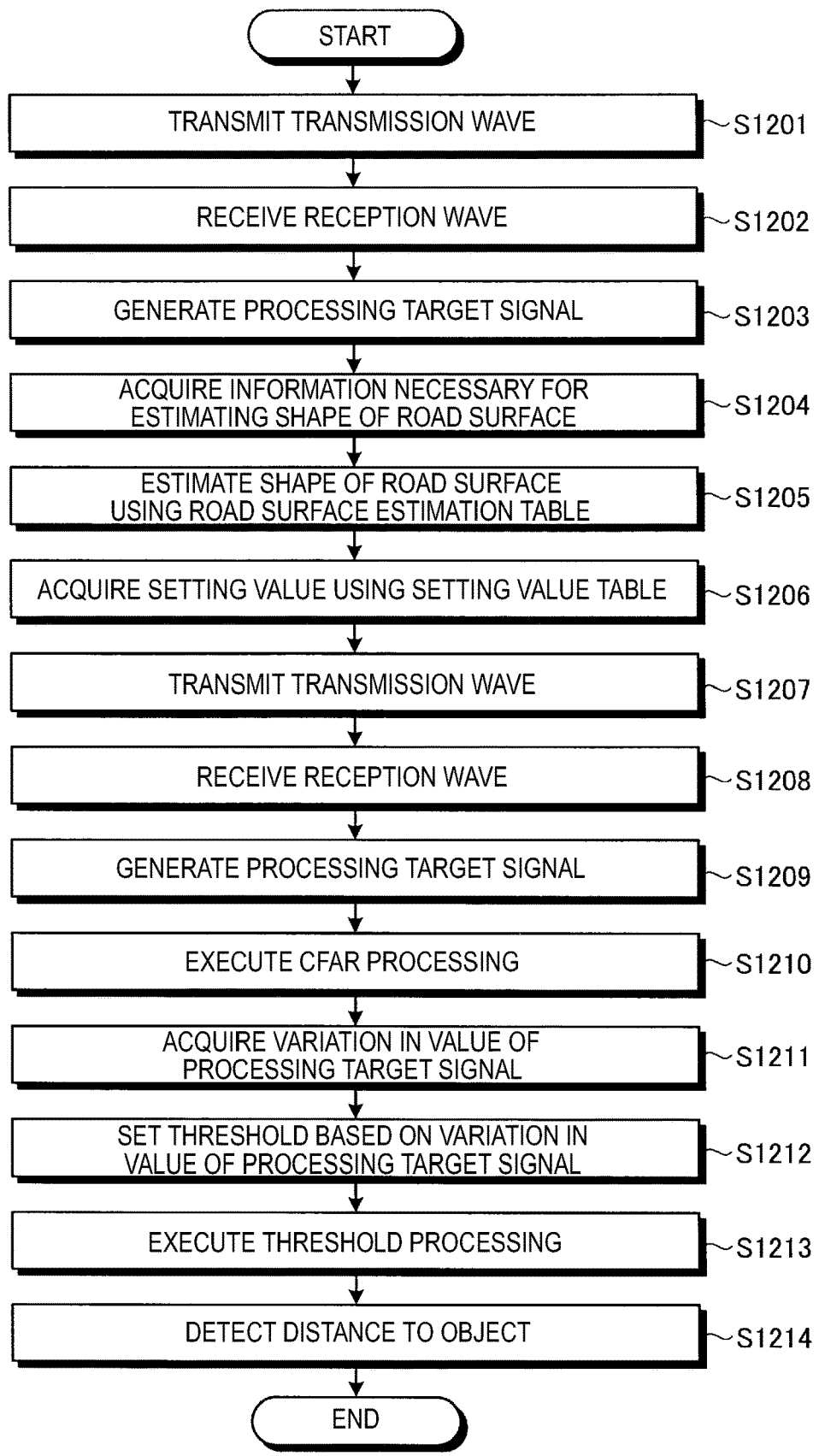
FIG. 12 is an exemplary and schematic flowchart illustrating a series of processing executed by the object detection device according to the embodiment to detect the distance to the object.

FIG. 12 is an exemplary and schematic flowchart illustrating a series of processing executed by the object detection device 200 according to the embodiment to detect information about an object.

As illustrated in FIG. 12, in the embodiment, first, in S1201, the wave transmitter 411 transmits a transmission wave according to the transmission signal generated by the code generation unit 412, the carrier wave output unit 413, the multiplier 414, and the amplification circuit 415 toward the outside of the vehicle 1. The transmission wave transmitted in S1201 is the second transmission wave for estimating the shape of the road surface.

Then, in S1202, the wave receiver 421 receives a reception wave. The reception wave received in S1202 is the second reception wave as a result of the second transmission wave transmitted in S1201 being reflected by an object existing outside the vehicle 1, and the received signal corresponding to the second reception wave is output to the envelope processing unit 425 after being subjected to amplification by the amplification circuit 422, suppression of noise by the filter processing unit 423, and acquisition of a correlation value by the correlation processing unit 424.

Then, in S1203, the envelope processing unit 425 obtains the envelope of the waveform of the correlation value signal based on the correlation value acquired by the correlation processing unit 424 and generates a processing target signal corresponding to the temporal change in the value of the envelope. The processing target signal generated in S1203 is the second processing target signal according to the second reception wave received in S1202.

Then, in S1204, the setting value acquisition unit 430 acquires information necessary for estimating the shape of the road surface based on the second processing target signal generated in S1203. As described above, the information necessary for estimating the shape of the road surface is three types of information of the encoded information indicating whether or not the second transmission wave and the second reception wave are encoded, the average characteristic based on the moving average of the values of the second processing target signal, and the variation in the difference between the value of the signal expressed by the empirical formula, of the plurality of empirical formulas set in advance, that best approximates the second processing target signal (part of a specific section among the sections of the temporal change) and the value of the second processing target signal.

Then, in S1205, the setting value acquisition unit 430 estimates the shape of the road surface using the road surface estimation table 430a. More specifically, the setting value acquisition unit 430 estimates the shape of the road surface according to the information acquired in S1203 by referring to the road surface estimation table 430a based on the information acquired in S1203.

Then, in S1206, the setting value acquisition unit 430 acquires the setting value using the setting value table 430b. More specifically, the setting value acquisition unit 430 acquires the setting value according to the shape of the road surface by referring to the setting value table 430b based on the estimation result in S1205. The setting value acquired in S1206 is output to the CFAR processing unit 426 and used for CFAR processing in S1210 described later.

Then, in S1207, the wave transmitter 411 transmits a transmission wave according to the transmission signal generated by the code generation unit 412, the carrier wave output unit 413, the multiplier 414, and the amplification circuit 415 to the outside of the vehicle 1. The transmission wave transmitted in S1207 is the first transmission wave for detecting the distance to the object existing outside the vehicle 1.

Then, in S1208, the wave receiver 421 receives the reception wave. The reception wave received in S1208 is the first reception wave received as a result of the first transmission wave transmitted in S1207 being reflected by an object existing outside the vehicle 1, and the received signal corresponding to the first reception wave is output to the envelope processing unit 425 after being subjected to amplification by the amplification circuit 422, suppression of noise by the filter processing unit 423, and acquisition of a correlation value by the correlation processing unit 424.

Then, in S1209, the envelope processing unit 425 obtains the envelope of the waveform of the correlation value signal based on the correlation value acquired by the correlation processing unit 424, and generates a processing target signal corresponding to the temporal change in the value of the envelope. The processing target signal generated in S1209 is the first processing target signal according to the first reception wave received in S1208.

Then, in S1210, the CFAR processing unit 426 executes CFAR processing. More specifically, the CFAR processing unit 426 acquires a difference signal based on the difference between the value (signal level) of the first processing target signal generated in S1209 and the average value of the values of the first processing target signal. However, when the average value of the values of the first processing target signal is less than the setting value acquired in S1206, the target that takes the difference from the value of the first processing target signal is not the average value but the setting value. Although the method of calculating the average value of the values of the first processing target signal differs depending on whether CA-CFAR processing is executed, GO-CFAR processing is executed, or another CFAR processing is executed, since a specific example of the method of calculating the average value has already been described, further description is omitted here.

On the other hand, in S1211, the threshold setting unit 428 acquires the variation in the value of the processing target signal. More specifically, the threshold setting unit 428 calculates the standard deviation as an indicator indicating the variation in the value of the first processing target signal generated in S1209, based on different criteria depending on the type of CFAR processing executed in S1210. Since a specific example of how to calculate the standard deviation according to the type of CFAR processing has already been described, further description is omitted here.

Then, in S1212, the threshold setting unit 428 sets a threshold which is a comparison target of the value of the difference signal acquired in S1210, based on the variation in the value of the processing target signal acquired in S1211. More specifically, the threshold setting unit 428 sets the threshold by executing processing such as multiplying the standard deviation of the value of the processing target signal acquired in S1211 by a predetermined gain.

Then, in S1213, the threshold processing unit 427 executes threshold processing for comparing the value of the difference signal acquired in S1210 with the threshold set in S1212.

Then, in S1214, the detection unit 429 detects the distance to the object that causes reflection of the transmission wave, based on the result of the threshold processing in S1213. More specifically, the detection unit 429 regards the timing at which the difference signal acquired in S1210, which is specified as a result of the threshold processing in S1213, exceeds the threshold set in S1212 as the timing at which the reception wave is received as a result of the first transmission wave being reflected by and returned from the object that is a detection target, and detects the distance to the object by the TOF method. Then, the process ends.

As described above, the object detection device 200 according to the embodiment includes the wave transmitter 411, the wave receiver 421, the CFAR processing unit 426, the threshold setting unit 428, and the detection unit 429. The wave transmitter 411 transmits the first transmission wave. The wave receiver 421 receives the first reception wave as the first transmission wave reflected by and returned from the object. The CFAR processing unit 426 samples a first processing target signal according to the first reception wave and acquires a difference signal based on a difference between a value of the first processing target signal for at least one sample according to the first reception wave received at a certain detection timing, and an average value of the values of the first processing target signal for a plurality of samples according to the first reception wave received in at least one of a first period and a second period of a predetermined time length that exist before and after the detection timing. The threshold setting unit 428 sets a threshold which is a comparison target with the value of the difference signal, based on variation in the value of the first processing target signal for a plurality of samples. The detection unit 429 detects information about the object at the detection timing based on a comparison result between the value of the difference signal and the threshold.

According to the configuration described above, even when there is a change in the environment, based on the variation in the value of the first processing target signal, for example, it is possible to dynamically set an appropriate threshold such that a reception wave as a transmission wave reflected by and returned from an object that is a detection target is detected but clutter is not detected. Accordingly, according to the configuration described above, it is possible to accurately detect the reception wave as the transmission wave reflected by and returned from the object that is a detection target, while appropriately reducing clutter regardless of the environment.

In the embodiment, the CFAR processing unit 426 selectively executes a plurality of types of CFAR processing including CA-CFAR processing and GO-CFAR processing according to settings. CA-CFAR processing is processing for acquiring a difference signal based on a difference between the value of the first processing target signal for at least one sample according to the first reception wave received at the detection timing described above and an average value of values of the first processing target signal for a plurality of samples according to the first reception wave received in both the first period and the second period described above. GO-CFAR processing is processing for acquiring the difference signal based on a difference between the value of the first processing target signal for at least one sample according to the first reception wave received at the detection timing described above and a larger average value of an average value of the values of the first processing target signal for a plurality of samples according to the first reception wave received in the first period described above and an average value of the values of the first processing target signal for a plurality of samples according to the first reception wave received in the second period described above. According to such a configuration, flexibility can be increased by properly using a plurality of types of CFAR processing.

In the embodiment, when the CFAR processing unit 426 executes CA-CFAR processing, the threshold setting unit 428 sets a threshold based on a standard deviation as an indicator indicating variation in the value of the first processing target signal for a plurality of samples according to the first reception wave received in both the first period and the second period. When the CFAR processing unit 426 executes GO-CFAR processing, the threshold setting unit 428 sets the threshold based on the standard deviation corresponding to the larger of the average values among a standard deviation as an indicator indicating the variation in the value of the first processing target signal for a plurality of samples according to the first reception wave received in the first period, and a standard deviation as an indicator indicating the variation in the value of the first processing target signal for a plurality of samples according to the first reception wave received in the second period. According to such a configuration, an appropriate threshold can be set in consideration of an appropriate standard deviation according to a type of CFAR processing.

In the embodiment, the wave transmitter 411 transmits the first transmission wave after encoding the first transmission wave so as to include predetermined identification information. Then, the CFAR processing unit 426 uses the correlation value signal based on the correlation value indicating the degree of similarity of the identification information between the first transmission wave and the first reception wave as the first processing target signal to acquire the difference signal. According to such a configuration, by using the correlation value signal as the first processing target signal, the difference signal can be acquired in a form that makes it easy to determine whether or not the first transmission wave and the first reception wave are similar to each other.

Furthermore, in the embodiment, the wave transmitter 411 transmits the second transmission wave before transmitting the first transmission wave. The wave receiver 421 receives the second reception wave as the second transmission wave reflected by the road surface as the object and returned before receiving the first reception wave. Here, the object detection device 200 further includes the setting value acquisition unit 430 that estimates a shape of the road surface based on information about a second processing target signal according to the second reception wave and acquires a setting value according to the shape of the road surface based on the estimation result. Then, the CFAR processing unit 426 acquires the difference signal based on a difference between the value of the first processing target signal for at least one sample according to the first reception wave received at the detection timing and a larger one of the average value of the values of the first processing target signal for a plurality of samples according to the first reception wave received in at least one of the first period and the second period and the setting value. According to such a configuration, the difference signal in which clutter according to the shape of the road surface is appropriately reduced can be acquired by always subtracting a value of at least equal to or larger than the setting value from the value of the first processing target signal.

In the embodiment, the setting value acquisition unit 430 estimates the shape of the road surface, based on encoded information indicating whether or not the second transmission wave and the second reception wave are encoded, an average characteristic based on a moving average of the values of the second processing target signal, and variation in a difference between a value of a signal expressed by an empirical formula that most closely approximates the second processing target signal among the plurality of empirical formulas set in advance and the value of the second processing target signal, as information about the second processing target signal, and acquires the setting value based on the estimation result. According to such a configuration, the shape of the road surface can be appropriately estimated based on three types of information of the encoded information, the average characteristic, and the variation, and the setting value can be appropriately acquired based on the estimation result.

In the embodiment, the setting value acquisition unit 430 estimates the shape of the road surface by using the road surface estimation table 430*a* stored in advance as information indicating a correspondence relationship between the encoded information, the average characteristic, the variation in the difference, and the shape of the road surface and acquires the setting value using the setting value table 430*b* stored in advance as information indicating a correspondence relationship between the road surface shape and the setting value. According to such a configuration, the shape of the road surface can be easily estimated only by referring to the road surface estimation table 430*a* based on three types of information of the encoded information, the average characteristic, and the variation, and the setting value can be easily acquired only by referring to the setting value table 430*b* based on the estimation result.

Modification Example

In the embodiment described above, although the technique of the disclosure is applied to a configuration for detecting information about an object by transmitting and receiving ultrasonic waves, the technique of the disclosure can also be applied to a configuration in which information about an object is detected by transmitting and receiving sound waves, millimeter waves, radar, electromagnetic waves, and the like as waves other than ultrasonic waves.

In the described above embodiment, although, as a target to which the technique of the disclosure is applied, an object detection device that detects a distance to an object is illustrated, the technique of the disclosure can also be applied to an object detection device that detects only the presence or absence of an object as information about the object.

Furthermore, in the embodiment described above, although the road surface estimation table 430*a* as an example of the first setting information and the setting value table 430*b* as an example of the second setting information are configured as separate data, both may be configured as a single piece of data. That is, in the technique of the disclosure, the estimation of the shape of the road surface and acquisition of the setting value may be executed based on single data indicating the correspondence relationship of the five types of information of the encoded information, the average characteristic, the variation, the shape of the road surface, and the setting value.

Although the embodiment and the modification example of the disclosure have been described above, the embodiment and the modification example are merely examples, and are not intended to limit the scope of the invention. The novel embodiment and modification example can be implemented in various forms, and various omissions, replacements, and changes can be made without departing from the gist of the invention. The embodiment and modification example described above are included in the scope and the gist of the invention, and are also included in the invention described in the claims and the scope equivalent thereto.

An object detection device as an example of this disclosure includes a transmission unit that transmits a first transmission wave, a reception unit that receives a first reception wave as the first transmission wave that is reflected by and returned from an object, a signal processing unit that samples a first processing target signal according to the first reception wave and acquires a difference signal based on a difference between a value of the first processing target signal for at least one sample according to the first reception wave received at a certain detection timing, and an average value of values of the first processing target signal for a plurality of samples according to the first reception wave received in at least one of a first period and a second period of a predetermined time length that exist before and after the detection timing, a threshold setting unit that sets a threshold which is a comparison target with the value of the difference signal, based on variation in the values of the first processing target signal for the plurality of samples, and a detection unit that detects information about the object at the detection timing based on a comparison result between the value of the difference signal and the threshold.

According to the configuration described above, even when there is a change in the environment, based on the variation in the value of the first processing target signal, for example, it is possible to dynamically set an appropriate threshold such that a reception wave as a transmission wave reflected by and returned from an object that is a detection target is detected but clutter is not detected. Accordingly, according to the configuration described above, it is possible to accurately detect the reception wave as the transmission wave reflected by and returned from the object that is a detection target, while appropriately reducing clutter regardless of the environment.

In the object detection device described above, the signal processing unit may selectively execute, according to settings, a plurality of types of constant false alarm rate (CFAR) processing, which include cell averaging constant false alarm rate (CA-CFAR) processing that acquires the difference signal based on a difference between the value of the first processing target signal for the at least one sample according to the first reception wave received at the detection timing and the average value of the values of the first processing target signal for the plurality of samples according to the first reception wave received in both the first period and the second period and greatest of constant false alarm rate (GO-CFAR) processing that acquires the difference signal based on a difference between the value of the first processing target signal for the at least one sample according to the first reception wave received at the detection timing and a larger one of the average value of the values of the first processing target signal for the plurality of samples according to the first reception wave received in the first period and the average value of the values of the first processing target signal for the plurality of samples according to the first reception wave received in the second period. According to such a configuration, flexibility can be increased by properly using a plurality of types of CFAR processing.

In this case, when the signal processing unit executes the CA-CFAR processing, the threshold setting unit may set the threshold based on a standard deviation as an indicator indicating variation in the values of the first processing target signal for the plurality of samples according to the first reception wave received in both the first period and the second period and when the signal processing unit executes the GO-CFAR processing, the threshold setting unit may set the threshold based on a standard deviation corresponding to the larger one of the average values among a standard deviation as an indicator indicating the variation in the values of the first processing target signal for the plurality of samples according to the first reception wave received in the first period and a standard deviation as an indicator indicating the variation in the values of the first processing target signal for the plurality of samples according to the first reception wave received in the second period. According to such a configuration, an appropriate threshold can be set in consideration of an appropriate standard deviation according to a type of CFAR processing.

In the object detection device described above, the transmission unit may transmit the first transmission wave after encoding the first transmission wave so as to include predetermined identification information, and the signal processing unit may use a correlation value signal based on a correlation value indicating a degree of similarity of identification information between the first transmission wave and the first reception wave as the first processing target signal to acquire the difference signal. According to such a configuration, by using the correlation value signal as the first processing target signal, the difference signal can be acquired in a form that makes it easy to determine whether or not the first transmission wave and the first reception wave are similar to each other.

In the object detection device described above, the transmission unit may transmit a second transmission wave before transmitting the first transmission wave, the reception unit may receive a second reception wave as the second transmission wave reflected by and returned from a road surface as the object before receiving the first reception wave, and the object detection device may further include a setting value acquisition unit that estimates a shape of the road surface based on information about a second processing target signal according to the second reception wave and acquires a setting value according to the shape of the road surface based on the estimation result, and the signal processing unit may acquire the difference signal based on a difference between the value of the first processing target signal for the at least one sample according to the first reception wave received at the detection timing and a larger one of the average value of the values of the first processing target signal for the plurality of samples according to the first reception wave received in at least one of the first period and the second period and the setting value. According to such a configuration, the difference signal in which clutter according to the shape of the road surface is appropriately reduced can be acquired by always subtracting a value of at least equal to or larger than the setting value from the value of the first processing target signal.

In this case, the setting value acquisition unit may estimate the shape of the road surface, based on encoded information indicating whether or not the second transmission wave and the second reception wave are encoded, an average characteristic based on a moving average of the values of the second processing target signal, and variation in a difference between a value of a signal expressed by an empirical formula that most closely approximates the second processing target signal among the plurality of empirical formulas set in advance and the value of the second processing target signal, as the information about the second processing target signal, and acquire the setting value based on the estimation result. According to such a configuration, the shape of the road surface can be appropriately estimated based on three types of information of the encoded information, the average characteristic, and the variation, and the setting value can be appropriately acquired based on the estimation result.

In this case, the setting value acquisition unit may estimate the shape of the road surface using first setting information stored in advance as information indicating a correspondence relationship between the encoded information, the average characteristic, the variation in the difference, and the shape of the road surface and acquire the setting value using second setting information stored in advance as information indicating a correspondence relationship between the road surface shape and the setting value. According to such a configuration, the shape of the road surface can be easily estimated only by referring to the first setting information based on three types of information of the encoded information, the average characteristic, and the variation, and the setting value can be easily acquired only by referring to the second setting information based on the estimation result.

In the object detection device described above, the transmission unit and the reception unit may be integrally configured as a transmission and reception unit including a single vibrator capable of transmitting and receiving sound waves. According to such a configuration, the configuration for transmitting and receiving the transmission wave and the reception wave can be simplified.

In the object detection device described above, the detection unit may detect a distance to the object as information about the object. According to such a configuration, the distance to the object, which is one of pieces of the information related to the object, can be detected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
   a transmission unit that transmits a first transmission wave;
   a reception unit that receives a first reception wave as the first transmission wave that is reflected by and returned from an object;
   a signal processing unit that samples a first processing target signal according to the first reception wave and acquires a difference signal based on a difference between a value of the first processing target signal for at least one sample according to the first reception wave received at a certain detection timing, and an average value of values of the first processing target signal for a plurality of samples according to the first reception wave received in at least one of a first period and a second period of a predetermined time length that exist before and after the detection timing;
   a threshold setting unit that determines a variation in the values of the first processing target signal in the plurality of samples, and sets a threshold which is a comparison target with the value of the difference signal, the threshold being set based on the variation in the values of the first processing target signal for the plurality of samples; and
   a detection unit that detects information about the object at the detection timing based on a comparison result between the value of the difference signal and the threshold,
   wherein
   the transmission unit transmits a second transmission wave before transmitting the first transmission wave,
   the reception unit receives a second reception wave as the second transmission wave reflected by and returned from a road surface as the object before receiving the first reception wave,
   the object detection device further comprises a setting value acquisition unit that estimates a shape of the road surface based on information about a second processing target signal according to the second reception wave and acquires a setting value according to the shape of the road surface based on the estimation result,
   the signal processing unit acquires the difference signal based on a difference between the value of the first processing target signal for the at least one sample according to the first reception wave received at the detection timing and a larger one of the average value of the values of the first processing target signal for the plurality of samples according to the first reception wave received in at least one of the first period and the second period and the setting value, and
   the setting value acquisition unit estimates the shape of the road surface, based on encoded information indicating whether or not the second transmission wave and the second reception wave are encoded, an average characteristic based on a moving average of the values of the second processing target signal, and variation in a difference between a value of a signal expressed by an empirical formula that most closely approximates the second processing target signal among the plurality of empirical formulas set in advance and the value of the second processing target signal, as the information about the second processing target signal, and acquires the setting value based on the estimation result.

2. The object detection device according to claim 1, wherein
   the signal processing unit selectively executes, according to settings, a plurality of types of constant false alarm rate processing which include
   cell averaging constant false alarm rate (CA-CFAR) processing that acquires the difference signal based on a difference between the value of the first processing target signal for the at least one sample according to the first reception wave received at the detection timing and the average value of the values of the first processing target signal for the plurality of samples according to the first reception wave received in both the first period and the second period, and
   greatest of constant false alarm rate (GO-CFAR) processing that acquires the difference signal based on a difference between the value of the first processing target signal for the at least one sample according to the first reception wave received at the detection timing and a larger one of the average value of the values of the first processing target signal for the plurality of samples according to the first reception wave received in the first period and the average value of the values of the first processing target signal for the plurality of samples according to the first reception wave received in the second period.

3. The object detection device according to claim 2, wherein,
   when the signal processing unit executes the CA-CFAR processing, the threshold setting unit sets the threshold based on a standard deviation as an indicator indicating variation in the values of the first processing target signal for the plurality of samples according to the first reception wave received in both the first period and the second period, and
   when the signal processing unit executes the GO-CFAR processing, the threshold setting unit sets the threshold based on a standard deviation corresponding to the larger one of the average values among a standard deviation as an indicator indicating the variation in the values of the first processing target signal for the plurality of samples according to the first reception wave received in the first period and a standard deviation as an indicator indicating the variation in the values of the first processing target signal for the plurality of samples according to the first reception wave received in the second period.

4. The object detection device according to claim 1, wherein the transmission unit transmits the first transmission wave after encoding the first transmission wave so as to include predetermined identification information, and the signal processing unit uses a correlation value signal based on a correlation value indicating a degree of similarity of identification information between the first transmission wave and the first reception wave as the first processing target signal to acquire the difference signal.

5. The object detection device according to claim 1, wherein the setting value acquisition unit estimates the shape of the road surface using first setting information stored in advance as information indicating a correspondence relationship between the encoded information, the average characteristic, the variation in the difference, and the shape of the road surface and acquires the setting value using second setting information stored in advance as information indicating a correspondence relationship between the road surface shape and the setting value.

6. The object detection device according to claim 1, wherein the transmission unit and the reception unit are integrally configured as a transmission and reception unit including a single vibrator capable of transmitting and receiving sound waves.

7. The object detection device according to claim 1, wherein the detection unit detects a distance to the object as information about the object.

8. The object detection device according to claim 1, wherein the variation in the values of the first processing target signal in the plurality of samples is a standard deviation of the value variation.

* * * * *